J. F. EICHENLAUB.
TRAP AND OUTLET CONSTRUCTION FOR BATH TUBS.
APPLICATION FILED JUNE 15, 1908.

908,651.

Patented Jan. 5, 1909.

Witnesses
Carl Stoughton
A. L. Phelps

Inventor
John F. Eichenlaub
By C. C. Shepherd
Attorney

UNITED STATES PATENT OFFICE.

JOHN F. EICHENLAUB, OF COLUMBUS, OHIO.

TRAP AND OUTLET CONSTRUCTION FOR BATH-TUBS.

No. 908,651.　　　　Specification of Letters Patent.　　　　Patented Jan. 5, 1909.

Application filed June 15, 1908. Serial No. 438,452.

*To all whom it may concern:*

Be it known that I, JOHN F. EICHENLAUB, a citizen of the United States, residing at Columbus, in the county of Franklin and State of Ohio, have invented certain new and useful Improvements in Trap and Outlet Construction for Bath-Tubs, of which the following is a specification.

Figure 1:
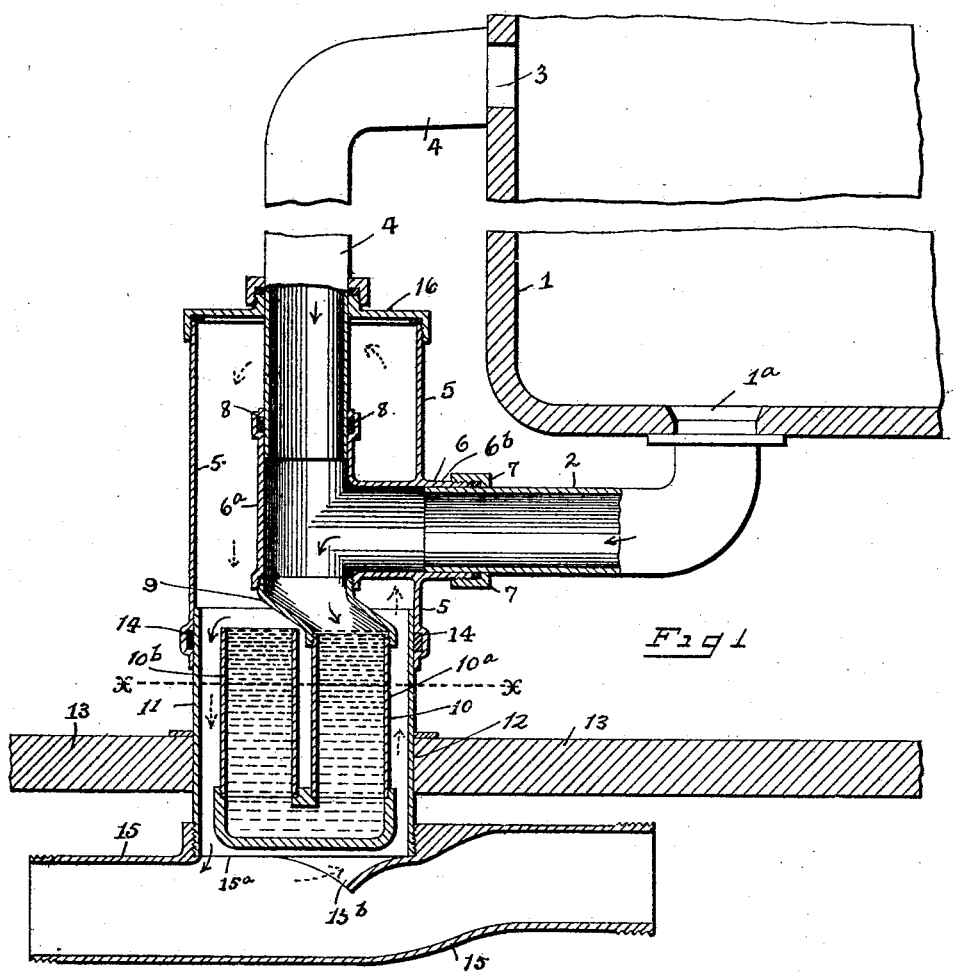
Figure 2:
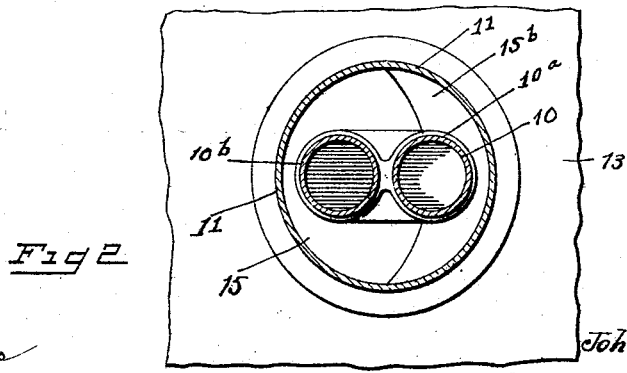

My invention relates to the improvement of trap and outlet construction for bath tubs and the objects of my invention are to provide an improved overflow, waste and trap construction for bath tubs and to combine the same with means for preventing the freezing of the water in the trap or outlet pipes leading thereto; to so construct my improved trap and parts connected therewith as to admit of the trap being readily accessible for the purpose of cleaning or repairs and to produce other improvements the details of which will be more fully pointed out hereinafter. These objects I accomplish in the manner illustrated in the accompanying drawing, in which:

Figure 1 is a sectional view of a portion of a bath tub showing partly in section and partly in elevation my improvements connected therewith, and, Fig. 2 is a transverse section on line $x$—$x$ of Fig. 1.

Similar numerals refer to similar parts throughout the several views.

1 represents a suitable form of bath tub, from the lower side of which leads downward and thence outward the usual waste pipe 2.

3 represents the overflow opening of the bath tub and 4 the overflow pipe which leads outward and thence downward from said opening 3.

5 represents a vertical cylindrical casing section, with which is formed a horizontal pipe arm 6 which extends partially within and partially without the casing 5. This pipe arm 6 has its inwardly extending portion terminating in a vertical T-head 6ª within the central portion of the casing 5, while the outwardly extending portion 6ᵇ of the pipe 6 is connected with the horizontal portion of the waste pipe 2 by suitable water and gas-tight connections 7.

The lower end of the vertical portion of the overflow pipe 4 fits within the upper end of the T-head 6ª, the latter being provided with an internal rubber gasket 8 which aids in forming a water and gas-tight connection of said overflow pipe and T-head. The lower end of the T-head 6ª has screwed into connection therewith an oblique pipe section or coupling 9, the lower end of which has a threaded connection with the upper end of one of the vertical members 10ª of a substantially U-shaped trap 10. The remaining vertical member of the trap which is indicated at 10ᵇ has its upper open end at substantially the same level as the upper end of the member 10ª.

The trap thus produced and caused to depend from the coupling section 9, is contained within a vertical cylindrical casing section 11 which extending through an opening 12 in a building floor 13, has its upper end portion closely fitting within the lower end of the upper cylindrical casing 5, the connection between said upper and lower casing sections being made water and gas tight through the medium of a rubber gasket 14 which is embedded in an inner side recess of the lower portion of the casing section 5.

As shown in the drawing, the lower portion of the trap body extends to a point slightly below the floor 13 and to a point immediately above the lower end of the casing section 11. The lower end of this casing section 11 is screwed, as shown, into the internally threaded boss of a building waste pipe 15 which runs beneath the floor 13 and which leads to a sewer. In the construction of the waste pipe section 15, the same is formed on one side of its opening 15ª, through which communication is effected with the interior of the casing section 11, with an inwardly projecting and downwardly curved lip 15ᵇ.

The upper end of the casing section 5 is closed by a cap 16 which is formed with a central top opening through which the pipe 4 passes. From the construction described, it will be observed that the united sections 5 and 11 form a cylindrical body, the greater portion of which projects above the floor of the room and the cylindrical body thus formed provides a housing for containing a chamber for the trap and the pipe connections therewith.

It will readily be understood that water from the bottom or waste outlet 1ª of the bath tub, will follow the line of full line arrows to the trap and from the upper end of the trap member 10ᵇ the water will pass downward to the sewer connection or waste pipe 15. It will also be understood that water which passes from the overflow opening 3 of the tub into the pipe 4, will likewise be directed into the trap.

Owing to the fact that water is constantly standing in the trap body, considerable difficulty has been experienced from the freezing of water in the trap and in the pipes connected therewith. By the construction which I have described, it will be understood that the warm sewer air which is always present in sewer connections, such as the pipe 15, will be permitted to follow the line of dotted arrows and rise within the casing body formed by the sections 5 and 11 and as the heated air from the sewer becomes cool, it will pass downward to the pipe 15. It will thus be seen that a circulation of warm air will be maintained within the housing which surrounds the trap and the water in the trap will thereby be prevented from freezing. In order to better direct the warm air from a sewer into the trap housing, I have provided the projecting or flaring lip 15$^b$ which will assist in directing the air upward.

It will be observed that the housing being formed in detachable sections, the same may be readily separated when desired, for the purpose of cleaning or repairing the trap or its connections.

By the construction shown and described, it will be seen that the trap and its immediate connections will be entirely hidden from view and that the housing which surrounds said trap and connections, may be made to present a neat and attractive appearance by suitably plating or ornamenting the same.

What I claim, is:

In a waste, overflow and trap construction for bath tubs, the combination with a tub, a trap, and waste and overflow pipes leading to said trap from said tub, of a casing inclosing said trap and the waste and overflow connections therewith, said casing being air and water tight, and a sewer connection below the trap connected with the lower end of said casing.

In testimony whereof I affix my signature in presence of two witnesses.

JOHN F. EICHENLAUB.

Witnesses:
  A. L. PHELPS,
  L. CARL STOUGHTON.